B. DARROW.
TIRE TREAD AND SIDE WALL STOCK AND METHOD OF PREPARING SAME.
APPLICATION FILED MAR. 13, 1918.
1,282,767.
Patented Oct. 29, 1918.
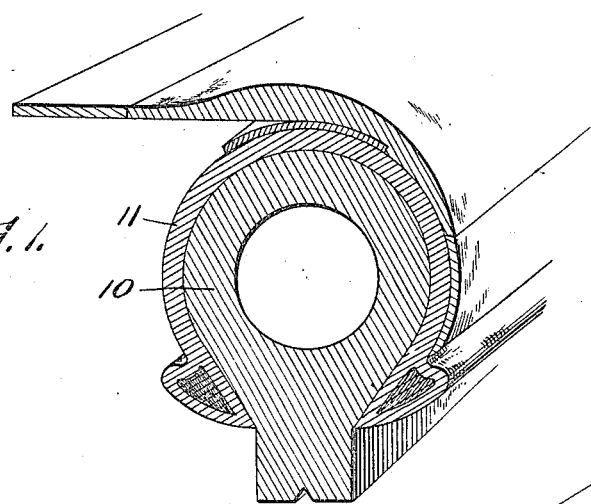
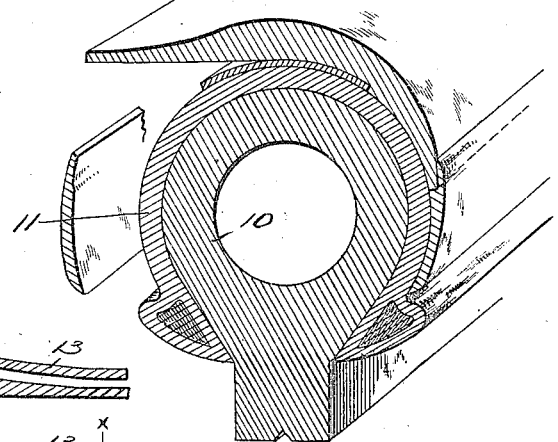
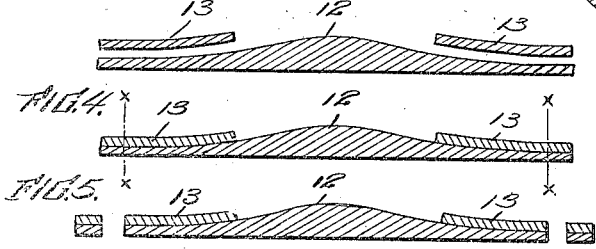
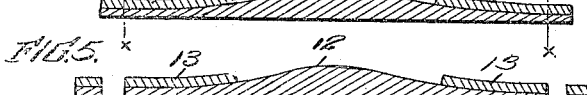
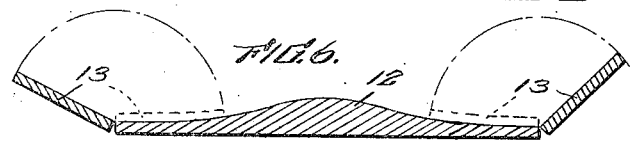
Inventor,
BURGESS DARROW,
By
his Attorney.

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

TIRE-TREAD AND SIDE-WALL STOCK AND METHOD OF PREPARING SAME.

1,282,767.     Specification of Letters Patent.     Patented Oct. 29, 1918.

Application filed March 13, 1918. Serial No. 222,219.

*To all whom it may concern:*

Be it known that I, BURGESS DARROW, a citizen of the United States, residing at Akron, in the county of Summit and State of Ohio, have invented new and useful Improvements in Tire-Tread and Side-Wall Stocks and Methods of Preparing Same, of which the following is a specification.

My present invention relates broadly both to improvements in construction of pneumatic tire casings and in the manufacturing method by which the improved construction is obtained. More specifically my invention relates to improvements in the manner of arranging the tread and side wall layers of rubber with respect to each other on the completed tire carcass and to an improved method of "finishing" the carcass, by which this novel arrangement of the tread and side walls is obtained.

An important object of the invention is to provide a method of "finishing" pneumatic tire carcasses whereby the strip or slab of rubber forming the tread and the strips or slabs of rubber forming the side wall coverings may be applied to the fabric carcass of the tire casing as a unit instead of being separately applied, with the result that the number of operations involved in finishing the tire are reduced from three separate operations to a single operation.

Another important object obtained by this present invention is the applying of the tread and side wall strips of rubber to the fabric carcass in such a manner that the edges of the tread strips and the outer edges of the side walls abut each other, causing the side wall strip to form a continuation of the edge portion of the tread strip and thereby producing for the casing an outer surface which is smooth and uninterrupted by a lap or shingle joint such as is now customarily present in the rubber covering of pneumatic tires.

A further object of the present invention is the provision of a simple method, capable of commercial use, for "laying up" the tread and side wall strips to form a one piece finishing slab of the character in question.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice and throughout the several views of which, similar reference numbers designate corresponding parts:

Figure 1 is a cross sectional perspective view illustrating a tire carcass constructed in accordance with the present invention upon a core of usual design;

Fig. 2 is a cross sectional perspective view of a tire carcass on a core, illustrating particularly the manner in which it was customary in the tire industry to finish tires prior to the present invention, and illustrative also of the construction which resulted from the practice of this method;

Fig. 3 is a diagrammatic view illustrating the first step in the method proposed for producing the unitary finishing slab;

Fig. 4 is a diagrammatic view illustrating the second step in the method proposed for producing the unitary finishing slab;

Fig. 5 is a diagrammatic view illustrating the third step in the method proposed for producing the unitary finishing slab;

Fig. 6 is a diagrammatic view illustrating the fourth step in the method proposed for producing the unitary finishing slab; and Fig. 7 is a diagrammatic view illustrating the fifth step in the method proposed for producing the unitary finishing slab.

In the drawings the numeral 10 represents a core of the usual type, and 11 the fabric carcass properly built thereon in the usual manner. The next step is the application of the cushion stock and breaker strip and the tire is then ready for the tread stock and side wall stock.

In Fig. 2 I have illustrated the old method of applying the tread and side walls, wherein the tread is first applied and rolled down, and then the side walls positioned with the upper edges overlapping the edges of the tread stock. It is here that I intend to depart from the usual custom or method and produce a structure as illustrated in Fig. 1.

The unitary slap of rubber before mentioned, is built up in the manner illustrated in Figs. 3 to 7 inclusive. The first step (Fig. 3) consists of laying the previously prepared calendered or tubed side walls 13 upon the tread stock 12, with their outer edges in line with the edges of the tread stock. The double stock is then trimmed on the lines x—x, x—x and the scrap removed which constitute the operations shown in Figs. 4 and 5.

The strips 13 are unfolded with their freshly cut edges as a pivot, (in the manner shown by dotted lines in Figs. 5 and 6). This brings the cut edges of the strips 13 in contact with the freshly cut edges of the tread stock 12 and forms a perfect butt joint with the result that a unitary slab is formed.

If found desirable, as it may be, in employing this method on certain classes of stocks, a roller may be applied to the butt joints formed by the freshly cut edges to insure proper adhesion of these edges.

From the foregoing it will be seen that I have produced a unitary finishing slab having a butt joint between the three parts, thereby preventing, after application to the carcass, the frequent tire fabric buckling or wave due to the flowing of extra rubber at the joint in molding as is present in a lapped joint.

Further, cracks sometimes experienced in a lapped joint due to the flowing of one rubber sheet over the other and not uniting properly on account of dust, etc., are eliminated.

What I claim is:

1. The method of preparing the tread and side wall stocks for application to the tire carcass which consists of the following steps: first—imposing the side wall strips in parallelism upon the face of the tread strip; second—cutting by shearing strokes the tread and each side wall strip interiorly of the outer edges of the tread and strip; and third—folding the side wall strips back from their initial position of imposition upon the tread strip until they form lateral continuations of the tread strip.

2. The method of preparing the tread and side wall stocks for application to the tire carcass as a unitary slab, which consists of the following steps: first—imposing the side wall strips upon the face of the tread strip with the outer edges of the side wall strips in approximate coincidence with the tread strip edges; second—simultaneously cutting by shearing strokes the tread and each side wall strip adjacent to the outer edges of the tread strip; and third—folding the side wall strips back from their initial position of imposition on the tread strip until they form lateral continuations of the tread strip.

3. The method of preparing the tread and side wall stocks for application to the tire carcass, which consists of the following steps: first—imposing the side wall strips in parallelism upon the face of the tread strip; second—cutting by shearing strokes the tread and each side wall strip interiorly of the outer edges of the tread and strip; third—folding the side wall strips back from their initial position of imposition upon the tread strip until they form lateral continuations of the tread strip; and fourth—rolling or otherwise applying pressure to the contacting edge portions of the tread strip and side wall strips.

4. As an article of manufacture, a unit for use in the fabrication of an automobile tire casing comprising a tread forming strip of rubber and side wall forming strips of rubber, the side wall strips being joined to the tread strip by adhesion of their edges to the edges of the tread strip, said side wall strips forming lateral continuations of the tread strip whereby a butt joint is formed between the tread and each side wall strip and whereby the entire surface of the tire casing may be made smooth and uninterrupted at the junction of the tread and side wall strips.

In testimony whereof I have signed my name in the presence of two subscribing witnesses.

BURGESS DARROW.

Witnesses:
B. J. McDANEL,
R. S. TROGNER.